United States Patent
Comanzo et al.

(10) Patent No.: US 9,346,999 B2
(45) Date of Patent: May 24, 2016

(54) METHOD OF FORMING EFFICIENT PHOSPHOR POWDERS

(71) Applicant: General Electric Company, Schenectady, NY (US)

(72) Inventors: Holly Ann Comanzo, Niskayuna, NY (US); Alok Mani Srivastava, Niskayuna, NY (US); William Winder Beers, Chesterland, OH (US); William Erwin Cohen, Solon, OH (US)

(73) Assignee: General Electric Company, Niskayuna, NY (US)

( * ) Notice: Subject to any disclaimer, the term of this patent is extended or adjusted under 35 U.S.C. 154(b) by 121 days.

(21) Appl. No.: 14/068,967

(22) Filed: Oct. 31, 2013

(65) Prior Publication Data

US 2014/0057110 A1 Feb. 27, 2014

Related U.S. Application Data (63) Continuation-in-part of application No. 13/248,594, filed on Sep. 29, 2011, now abandoned.

(51) Int. Cl.
  *C09K 11/77* (2006.01)
  *C09K 11/02* (2006.01)

(52) U.S. Cl.
  CPC ........... *C09K 11/7787* (2013.01); *C09K 11/025* (2013.01); *Y10T 428/2982* (2015.01)

(58) Field of Classification Search
  CPC .. C09K 11/02; C09K 11/025; C09K 11/7769; C09K 11/7787; C01P 2004/61; H01L 33/502; Y10T 428/2982
  USPC ................... 252/301.4 R; 313/467, 486, 503; 428/402, 690
  See application file for complete search history.

(56) References Cited

U.S. PATENT DOCUMENTS

| | | | | |
|---|---|---|---|---|
| 3,458,450 | A * | 7/1969 | Masuda et al. | 252/301.4 R |
| 3,798,173 | A * | 3/1974 | Nath et al. | C09K 11/7787 252/301.4 F |

(Continued)

FOREIGN PATENT DOCUMENTS

| | | |
|---|---|---|
| EP | 1052278 B1 | 2/2004 |
| EP | 1429370 A2 | 6/2004 |

(Continued)

OTHER PUBLICATIONS

Takahashi et al., "Synthesis of Red Phosphor (Y2O3:Eu3+) from Waste Phosphor Sludge by Coprecipitation Process", 2002, Shigen to Sozai, vol. 118, pp. 413-418.*

(Continued)

*Primary Examiner* — Jonathan Johnson
*Assistant Examiner* — Lynn Edmondson
(74) *Attorney, Agent, or Firm* — Mary Louise Stanford (57) ABSTRACT

A method of forming a phosphor composition is disclosed. The method includes mixing co-precipitated yttrium-europium oxalate with an inorganic flux material to form an oxalate-flux mixture; and heating the oxalate-flux mixture at a temperature in a range from about 800° C. to about 1400° C., to form the phosphor composition. The phosphor has a general formula of $(Y_{1-x-y}A_y Eu_x)_2 O_3$ with $0<x<1$ and $0 \leq y<1$, wherein A is at least one element selected from the group consisting of gadolinium, lutetium, lanthanum, scandium and terbium.

10 Claims, 6 Drawing Sheets

(56) References Cited

U.S. PATENT DOCUMENTS

| | | | |
|---|---|---|---|
| 5,230,831 | A | 7/1993 | Srivastava |
| 7,525,094 | B2 | 4/2009 | Cooke et al. |
| 7,906,790 | B2 | 3/2011 | Radkov et al. |
| 7,959,827 | B2 | 6/2011 | Comanzo et al. |
| 7,990,040 | B2 | 8/2011 | Srivastava et al. |
| 2001/0004250 | A1* | 6/2001 | Kado .............. H01J 11/42 345/60 |
| 2006/0105170 | A1 | 5/2006 | Dobson et al. |
| 2009/0009051 | A1 | 1/2009 | Tsukada |
| 2009/0309482 | A1 | 12/2009 | Srivastava et al. |
| 2010/0051868 | A1 | 3/2010 | Le-Mercier et al. |
| 2010/0142189 | A1 | 6/2010 | Hong et al. |
| 2011/0052472 | A1 | 3/2011 | Wan |
| 2011/0101387 | A1 | 5/2011 | Kinomoto |
| 2011/0305005 | A1 | 12/2011 | Tsukatani et al. |
| 2012/0052961 | A1 | 3/2012 | Crawford et al. |
| 2013/0020928 | A1 | 1/2013 | Srivastava et al. |
| 2013/0082207 | A1 | 4/2013 | Srivastava et al. |

FOREIGN PATENT DOCUMENTS

| | | | | |
|---|---|---|---|---|
| WO | WO 2009012651 A1 * | 1/2009 | .......... | C01F 17/0043 |
| WO | 2013048663 A1 | 4/2013 | | |

OTHER PUBLICATIONS

Muresan et al., "Structural and luminescence characterization of yttrium oxide based phosphors prepared by wet-chemical method", Mar. 2011, Journal of Optoelectronics and Advanced Materials, vol. 13, No. 3, pp. 183-189.*

Tu et al., "Eu/Tb ions co-doped white light luminescence Y2O3 phosphors", available online May 26, 2011, Journal of Luminescence, vol. 131, pp. 2569-2573.*

Wang et al., "Monodisperse Spherical Core-Shell-Structured Phosphors obtained by Functionalization of Silica Spheres with Y2O3:Eu3+ Layers for Field Emission Displays", Applied Physics Letters, Oct. 2005,vol. 87, Issue 18, pp. 181907-181907-3.

Wang et al., "Core-Shell Structured SiO2@YVO4:Dy3+/Sm3+ Phosphor Particles: Sol-Gel Preparation and Characterization", Journal of Colloid and Interface Science, Aug. 1, 2006, vol. 300, Issue 1, pp. 176-182.

Wen et al.,"Synthesis of nanocrystalline yttria powder and fabrication of transparent YAG ceramics", Journal of the European Ceramic Society, 2004, vol. 24, pp. 2681-2688.

Elisabeth-Jeanne Popovici et al.,"Synthesis and characterisation of europium activated yttrium oxide fine powders", Journal of Alloys and Compounds, May 31, 2007, vol. 434-435, pp. 809-812.

Teng et al., "Preparation and Luminescence Properties of the Red-Emitting Phosphor (Sr1-xCax)2Si5n8:Eu2+ with Different Sr/Ca Ratios", Feb. 2009, Journal of Rare Earths, vol. 27, Issue 1,pp. 58-61.

Cichy et al., "Field-Emission Light Sources Utilizing Carbon Nanotubes and Composite Phosphor made of SiO2 Nanospheres Covered with Y2O3:Eu", Journal of Vacuum Science & Technology B: Microelectronics and Nanometer Structures, Mar. 2009, vol. 27, Issue 2, pp. 757-760.

Zhang et al., "Synthesis of Y2O3:Eu3+ Phosphors by Surface Diffusion and their Photoluminescence Properties", Transactions of Nonferrous Metals Society of China, Jan. 2010, vol. 20, Issue 1, pp. 115-118.

* cited by examiner

METHOD OF FORMING EFFICIENT PHOSPHOR POWDERS

CROSS-REFERENCE TO RELATED APPLICATIONS

This application is a continuation-in-part of the co-pending U.S. patent application Ser. No. 13/248,594, entitled "CORE-SHELL PHOSPHOR AND METHOD OF MAKING THE SAME" filed on 29 Sep. 2011.

BACKGROUND

The invention generally relates to yttrium oxide based phosphor powders. More particularly, the invention relates to a method for making the yttrium oxide based phosphor powders having high efficiency.

Yttrium oxide with europium doping (also known as "YEO") is a well-known phosphor composition. A YEO phosphor composition emits red light when it is irradiated by certain high-energy radiation having wavelengths below the visible range. This property is advantageously used on an industrial scale, for example, in trichromatic fluorescent lamps, backlighting systems for liquid crystal displays and in plasma systems.

Various synthesis methods have been developed to maximize the efficiency of YEO phosphor. Some of the synthesis methods improve crystallinity of the phosphor thereby enhancing the efficiency. Some other synthesis methods optimize the particle size distribution and morphology of phosphor particles in order to get a uniform coating during lamp coating.

However, a demand for a simple and cost effective method of forming crystalline YEO with better size and microstructure distribution and having high efficiency is an unmet need. The present invention is directed towards a simple method of forming higher efficiency YEO powders.

BRIEF DESCRIPTION

In accordance with one aspect of the present invention, A method of forming a phosphor composition is disclosed. The method includes mixing co-precipitated yttrium-europium oxalate with an inorganic flux material to form an oxalate-flux mixture; and heating the oxalate-flux mixture at a temperature in a range from about 800° C. to about 1400° C., to form the phosphor composition. The phosphor has a general formula of $(Y_{1-x-y}A_yEu_x)_2O_3$ with $0<x<1$ and $0\leq y<1$, wherein A is at least one element selected from the group consisting of gadolinium, lutetium, lanthanum, scandium and terbium.

In accordance with another aspect, the present invention provides a method of making a phosphor composition. The method includes the steps of forming an oxalate-flux mixture by mixing a co-precipitated oxalate of yttrium, europium and gadolinium with a barium borate flux material; and heating the oxalate-flux mixture at a temperature in a range from about 1000° C. to about 1400° C. in air, to form a phosphor composition having general formula $(Y_{1-x-y}Gd_yEu_x)_2O_3$ wherein $0<x<1$ and $0<y<1$.

In yet another embodiment, a method is provided. The method includes heating a mixture including co-precipitated yttrium-europium oxalate to a temperature in a range from about 800° C. to about 1400° C. with a barium borate flux material, cooling the heated mixture to ambient temperature to provide a phosphor dispersed in the flux material, and separating the phosphor from the flux material.

DETAILED DESCRIPTION

In the following specification and the claims, which follow, reference will be made to a number of terms, which shall be defined to have the following meanings.

The singular forms "a", "an" and "the" include plural references unless the context clearly dictates otherwise.

"Optional" or "optionally" means that the subsequently described event or circumstance may or may not occur, and that the description includes instances where the event occurs and instances where it does not.

Whenever a particular feature of the invention is said to comprise or consist of at least one of a number of elements of a group and combinations thereof, it is understood that the feature may comprise or consist of any of the elements of the group, either individually or in combination with any of the other elements of that group.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As used herein, the term "dimension" or "size" refers to the longest Euclidean distance between two points in a particle. For example, if the particle is spherical, the diameter is the size of the particle. For an elliptical particle, the size is taken as the major axis of the ellipse. In hydrated form, the size of a spherical particle may be the mean or average hydrodynamic diameter of the particle. Similarly, a phosphor particle having a dimension of 1 μm refers to a phosphor particle that has a longest dimension of at least 1 μm. For a phosphor particle of irregular geometry, the size of the particle may be described in terms of its dimension, the longest Euclidean distance between two points in the particle.

In one embodiment, the present invention provides a method of making powders of YEO phosphor composition. Hence the product obtained by performing these method steps is in a powder form rather than in the form of a sintered solid material. Few grains of the phosphor composition may combine together to form powder particles that have size ranges of few micrometers.

The method includes the steps of mixing a co-precipitated yttrium-europium oxalate with an inorganic flux material to form an oxalate-flux mixture; and heating the oxalate-flux mixture at a temperature in a range from about 800° C. to about 1400° C., to form a phosphor composition having general formula $(Y_{1-x-y}A_yEu_x)_2O_3$ with $0<x<1$ and $0\leq y<1$, wherein A is at least one element selected from the group consisting of gadolinium, lutetium, lanthanum, scandium and terbium. Thus, the source of yttrium used here is yttrium oxalate rather than any other precursors such as oxides, nitrates, phosphates, carbonates, sulfates, acetates, citrates and/or hydroxides.

In one embodiment, the yttrium oxalate and europium oxalates are co-precipitated and the co-precipitated yttrium-europium oxalate mixture is directly mixed with an inorganic flux material and heated without performing any other intermediate steps such as, for example, decomposing the yttrium-europium oxalate before mixing with the inorganic flux.

In one embodiment, the inorganic flux material may be selected from one or more of sodium tetraborate, lithium tetraborate ($Li_2B_4O_7$), barium carbonate, borax, boron trioxide ($B_2O_3$), boric acid, and barium borate. In another embodiment, the inorganic flux materials may further include any other conventional fluxing agent, such as aluminum trifluoride ($AlF_3$), ammonium chloride ($NH_4Cl$). In a particular embodiment of this invention, the flux used is barium borate with the general formula $BaB_8O_{13}$. The $BaB_8O_{13}$ may be directly added in the final form or may be added in the form of a mixture of barium carbonate and boron trioxide, and decomposed to form $BaB_8O_{13}$ during the reaction. In one embodiment, the concentration of inorganic flux material is less than about 20% of the oxalate-flux mixture, particularly less than about 10% by weight of the total weight of the mixture. In one particular embodiment, the inorganic flux concentration in the oxalate-flux mixture is less than about 5 weight % of the mixture.

Traditionally, it is the oxide material that is obtained by the thermal decomposition of the corresponding oxalate salt that is mixed with the fluxing material and heated at a predetermined temperature and time.

Directly mixing the co-precipitated yttrium-europium oxalate with an inorganic flux material, and heating produces better crystalline YEO powders with a favorable particle size distribution giving rise to better phosphor performance as compared to the standard YEO phosphor powders.

In one embodiment, the oxalate mixture further includes at least one element selected from a group consisting of gadolinium, lanthanum, scandium, terbium, and lutetium to form a substituted YEO. For example, in one embodiment, the oxalate-flux mixture comprises yttrium-europium-gadolinium oxalate. Yttrium-europium-gadolinium oxalate may be thoroughly mixed with inorganic flux material, and then subjected to the required heat-treatment to form final phosphor powder.

The starting materials may be mixed with the flux by any mechanical method including, but is not limited to, stirring or blending in a high-speed blender or a ribbon blender. In a typical process, the starting materials may be combined via a dry blending process. The starting materials may be combined and pulverized together in a ball mill, a hammer mill, or a jet mill.

The oxalate-flux mixture may be heated at a predetermined temperature that is usually between 900° C. and 1400 C, depending on the composition of the desired final phosphor powder. The temperature of heat-treating the oxalate-flux mixture to form YEO powder may be different from the temperature that is needed to form the substituted YEO powder. In one embodiment, depending on the final composition of the phosphor powder, the heating of the oxalate-flux mixture is carried out at a temperature in a range from about 1000° C. to about 1375° C.

In one embodiment, the heating of the oxalate-flux mixture is carried out in an atmosphere comprising oxygen. The atmosphere may be air, or any other oxygen rich atmosphere.

The resultant phosphor powders when cooled to ambient temperature may still contain the flux material. For obtaining pure phosphor powders, these flux materials may or may not need to be separated. The dispersed product may be separated from the inorganic flux materials by washing, filtering and drying for a sufficient time to obtain the desired phosphor composition.

In one embodiment, the phosphor powder has a homogeneous concentration of europium throughout different grains of YEO powder. In one embodiment, the powder formed by the above-disclosed method includes a phosphor composition having formula $(Y_{1-x-y}A_yEu_x)_2O_3$ with $0<x<1$ and $0\leq y<1$, wherein A is at least one element selected from the group consisting of gadolinium, lutetium, lanthanum, scandium and terbium.

In one embodiment, the value of x is in a range from about 0.01 to about 0.90. In certain embodiments, the value of x is in a range from about 0.1 to about 0.5. In certain specific embodiments, the value of x is in a range from about greater than 0 to about 0.5 ($0<x\leq0.5$). In one specific embodiment, the phosphor composition is of the formula $(Y_{0.955}Eu_{0.045})_2O_3$.

In one embodiment, the phosphor composition includes at least one rare earth metal selected from the group consisting of gadolinium, lanthanum, lutetium, scandium, and terbium. In one embodiment, the composition comprises gadolinium.

In one embodiment, the powder formed by the above-disclosed method includes a phosphor composition having formula $(Y_{1-x-y}A_yEu_x)_2O_3$ where $0<x<0.5$ while $0\leq y<1.0$. Thus, the YEO composition has a non-zero europium doping that occupies less than 50% of the atomic sites of yttrium. In another embodiment, $0<x<0.5$ while $0<y<1.0$. In one embodiment, $x+y<1$, and in a further embodiment, $x+y<0.5$. In one embodiment, x is between 0.01 and 0.3. In a specific embodiment, the phosphor composition includes $(Y_{0.067}Gd_{0.3}Eu_{0.03})_2O_3$.

The phosphor materials synthesized by the above-described method may have a particulate structure with a regular geometry or an irregular geometry. The particles may be of various shapes, such as spherical, elliptical, or cubical.

The powder particles may have an average longest dimension in a range from about 0.2 μm to about 20 μm. In some embodiments, the average particle size is in a range from about 1 μm to about 10 μm.

The luminescence property of a phosphor may be quantified by the conversion yield of the phosphor, which corresponds to a ratio of the number of photons emitted by a phosphor to the number of photons absorbed from the excitation beam. The conversion yield of a phosphor is evaluated by measuring, in the visible range of the electromagnetic spectrum, the emission of a phosphor under an excitation in the UV or VUV range generally at a wavelength below 280 nm. The value of the brightness obtained for the phosphor, at emission intensity integrated between 400 and 700 nm, is then compared with that of a reference phosphor. The phosphor has a strong red emission under UV excitation. Thus, the phosphor may be used in lighting or display systems having an excitation source in the UV range (200-350 nm), for example around 254 nm.

The phosphor may be used in UV excitation devices, such as in trichromatic lamps, especially in mercury vapor trichromatic lamps, lamps for backlighting liquid crystal systems, plasma screens, xenon excitation lamps, devices for excitation by light-emitting diodes (LEDs), fluorescent lamps, cathode ray tube, plasma display device, liquid crystal display (LCD), and UV excitation marking systems. These uses are meant to be merely exemplary and not exhaustive.

EXAMPLES

Phosphor powders of $(Y,Eu)_2O_3$ and $(Y, Gd, Eu)_2O_3$ were synthesized, in accordance with different examples of the invention as described below:

Sample 1 was an $(Y,Eu)_2O_3$ phosphor prepared by heat-treating a yttrium-europium oxide at a temperature of about 1500° C., without the addition of any flux. The yttrium-europium oxide was prepared by decomposing a co-precipitated yttrium-europium oxalate mixture.

Sample 2 was an $(Y,Eu)_2O_3$ phosphor prepared by heat-treating a yttrium-europium oxide at a temperature of about 1500° C., with the addition of about 1000 ppm of $BaB_8O_{13}$ flux. The yttrium-europium oxide was prepared by decomposing a co-precipitated yttrium-europium oxalate mixture.

Sample 3 was an $(Y,Eu)_2O_3$ phosphor prepared by heat-treating co-precipitated yttrium-europium oxalate at a temperature of about 1300° C. with the addition of about 900 ppm of $BaB_8O_{13}$ flux.

Sample 4 was an $(Y, Gd, Eu)_2O_3$ phosphor prepared by heat-treating a yttrium-gadolinium-europium-oxide at a temperature of about 1500° C., without the addition of any flux. The yttrium-gadolinium-europium oxide was prepared by decomposing a co-precipitated yttrium-gadolinium-europium oxalate mixture.

Sample 5 was an $(Y, Gd, Eu)_2O_3$ phosphor prepared by heat-treating a yttrium-gadolinium-europium-oxide at a temperature of about 1338° C. with the addition of about 1250 ppm of $BaB_8O_{13}$ flux. The yttrium-gadolinium-europium oxide was prepared by decomposing a co-precipitated yttrium-gadolinium-europium oxalate mixture.

Sample 6 was an $(Y, Gd, Eu)_2O_3$ phosphor prepared by heat-treating a co-precipitated yttrium-gadolinium-europium-oxalate at a temperature of about 1250° C. with the addition of about 1100 ppm of $BaB_8O_{13}$ flux.

Synthesis

The europium doping level was typically maintained at less than 10 mole %. The reaction mixture for sample 1-sample 6 were transferred to alumina crucibles and fired in a furnace in air at the specific temperatures mentioned above. At the end of the stipulated time, the samples thus obtained were ground in a mortar and pestle and sieved through a 60 mesh sieve. They were then wet milled to break up agglomerates. The powders were wet sieved through a 325 mesh screen and filtered and dried to obtain the final product.

Whenever oxalate powders were directly used as reactants, the flux was mixed with the reactants before any kind of decomposition of the reactant oxalates.

Characterization

The phosphor particles prepared were characterized by measuring the particle size and morphology by scanning electron microscope (SEM), and phase formation by powder X-Ray Diffraction (XRD). Quantum efficiency and absorption measurements were carried out by pressing the product powder in an aluminum plaque and a recording a spectra using a SPEX Flouorlog double spectrometer against a known internal standard.

Figure 1:
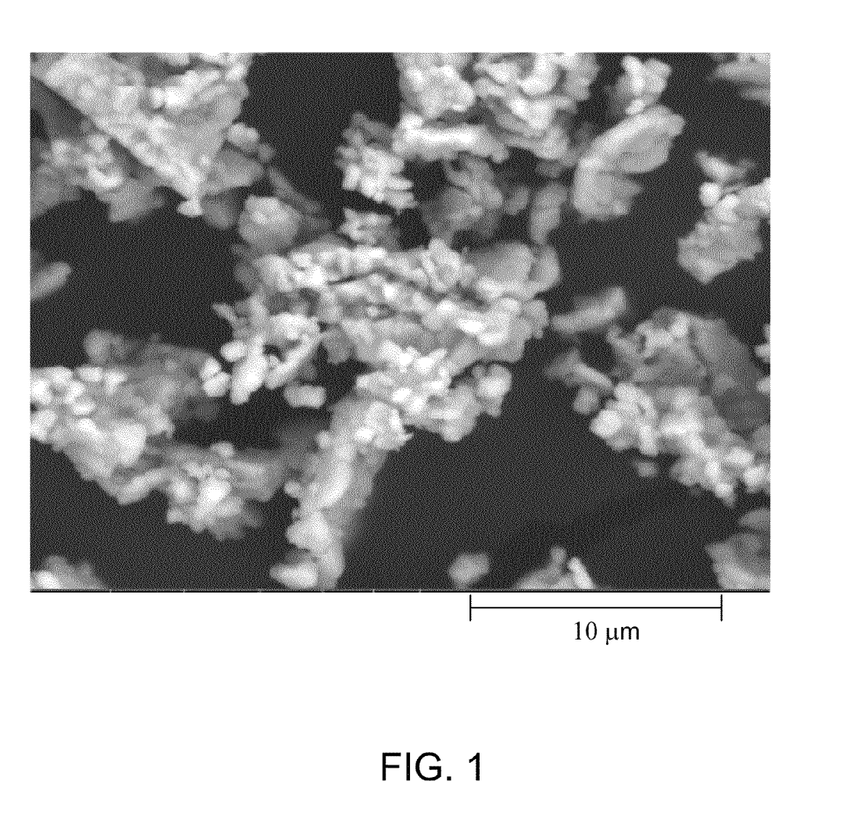
FIG. 1 is a scanning electron microscope (SEM) picture of sample 1, prepared using a co-precipitated oxalate mixture decomposed to an oxide and fired without flux.

FIGS. 1-6 show the SEM pictures of the samples 1-6 respectively. FIG. 1 corresponds to the SEM of sample 1, and displays a non-uniform microstructure and shape of the powder particles with the particle size ranging from less than 1 micrometer to greater than 5 micrometers.

Figure 2:
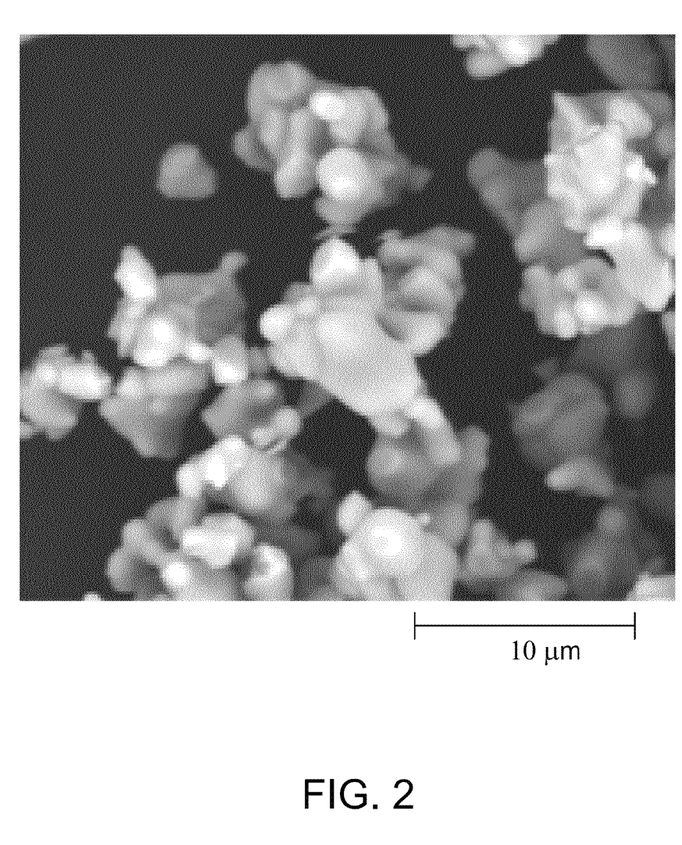
FIG. 2 is a scanning electron microscope (SEM) picture of sample 2, prepared using a co-precipitated oxalate mixture decomposed to an oxide and fired with flux.

FIG. 2 corresponds to the SEM of sample 2, and displays a non-uniform, and fused microstructure of the powder particles with an average particle size ranging from about 1 micrometer to about 4 micrometers.

Figure 3:
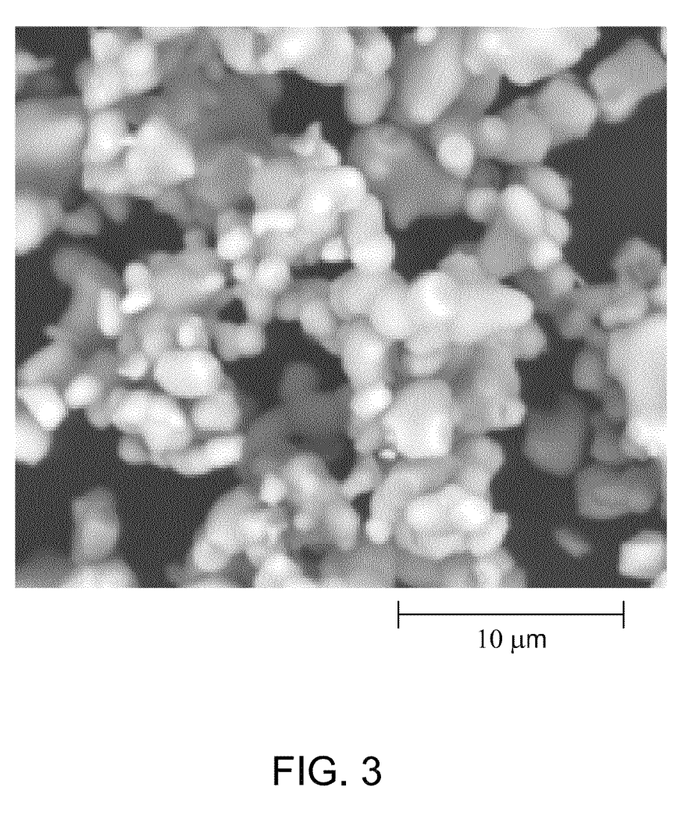
FIG. 3 is a scanning electron microscope (SEM) picture of sample 3, prepared using a co-precipitated oxalate mixture with flux, according to one embodiment of this invention.

FIG. 3 corresponds to the SEM of sample 3, produced by the oxalate mixtures with flux, and displays the shapes that seem to be similar to the sample 2, but with controlled particle size. The particles of sample 3 appear to be ranging from about 1 micrometer to about 2.5 micrometers.

Figure 4:
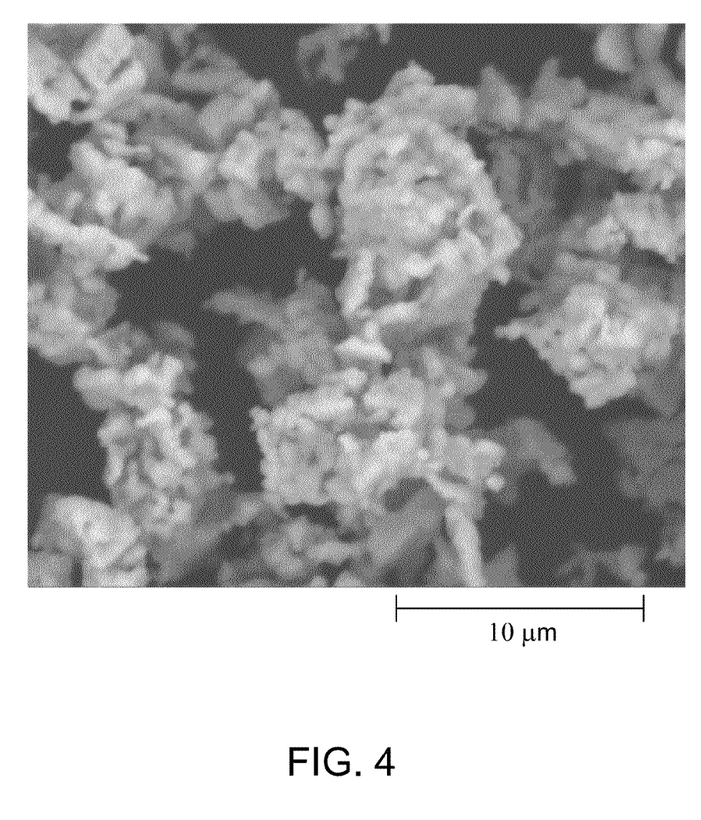
FIG. 4 is a scanning electron microscope (SEM) picture of sample 4, prepared using a co-precipitated oxalate mixture decomposed to an oxide and fired without flux.

FIG. 4 corresponds to the SEM of sample 4, and displays a non-uniform microstructure and shape of the powder particles with the particle size ranging from less than 1 micrometer to greater than 5 micrometers.

Figure 5:
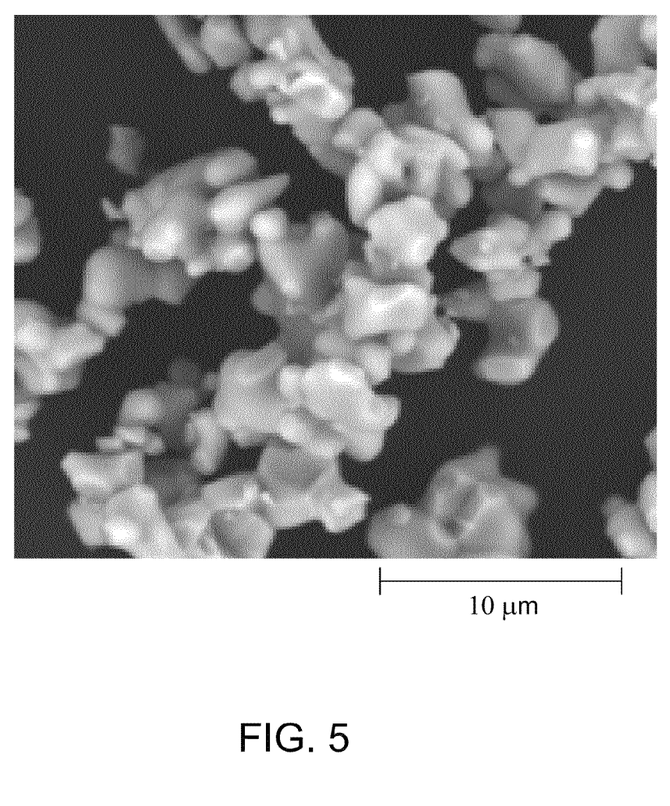
FIG. 5 is a scanning electron microscope (SEM) picture of sample 5, prepared using a co-precipitated oxalate mixture decomposed to an oxide and fired with flux.

FIG. 5 corresponds to the SEM of sample 5, and displays a non-uniform, and fused microstructure of the powder particles with an average particle size ranging from about 1 micrometer to about 3 micrometers.

Figure 6:
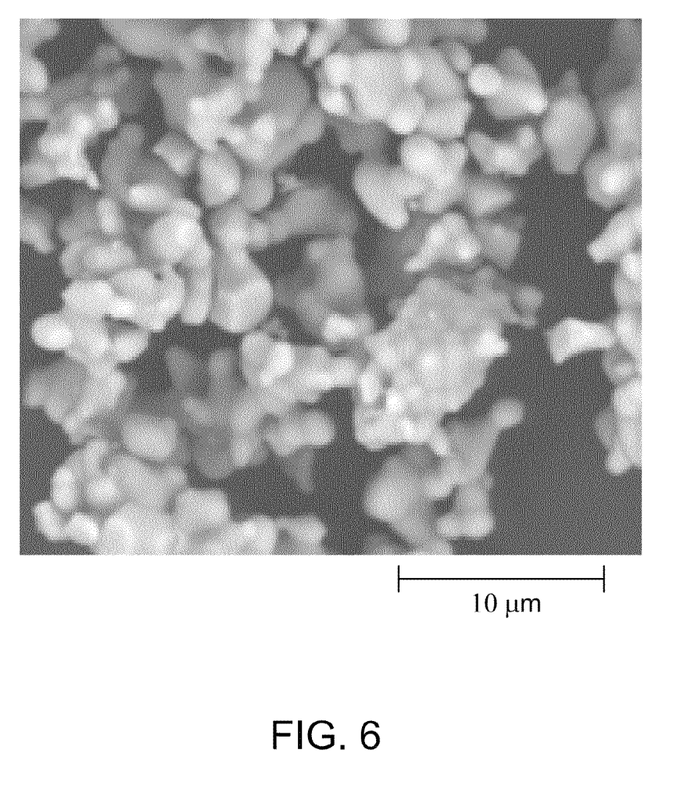
FIG. 6 is a scanning electron microscope (SEM) picture of sample 6, prepared using a co-precipitated oxalate mixture fired with flux, according to one embodiment of this invention.

FIG. 6 corresponds to the SEM of sample 6, produced by the oxalate mixtures with flux, and displays the shapes that seem to be similar to the sample 2, but with controlled particle size. The particles of sample 3 appear to be ranging from about 1 micrometer to about 2 micrometers.

The quantum efficiency (QE) of the phosphor compounds of samples 1-6 were determined in comparison with that of the commercially available phosphor employed as a standard with an absorbance (ABS) value of 74. Table 1 provides the QE data of the samples 1-sample 6 along with the type, form, flux level, and firing temperature details, where % LPW is the % lumens per watt attained as compared to the standard and n/a implies where the test data were not yet measured

| Sample | Type | Form | Flux level (ppm) | Firing Temp (° C.) | % LPW |
| --- | --- | --- | --- | --- | --- |
| Sample 1 | YEO | oxide | 0 | 1500 | 98.6 |
| Sample 2 | YEO | oxide | 1000 | 1365 | 101.1 |
| Sample 3 | YEO | oxalate | 900 | 1300 | n/a |
| Sample 4 | YEG | oxide | 0 | 1500 | 100.3 |
| Sample 5 | YEG | oxide | 1250 | 1338 | 98 |
| Sample 6 | YEG | oxalate | 1100 | 1250 | 100.2 |

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. It is also anticipated that advances in science and technology will make equivalents and substitutions possible that are not now contemplated by reason of the imprecision of language and these variations should also be construed where possible to be covered by the appended claims.

The invention claimed is:

1. A method, comprising:
   mixing co-precipitated yttrium-europium oxalate with an inorganic flux material comprising $BaB_8O_{13}$ to form an oxalate-flux mixture; and
   heating the oxalate-flux mixture at a temperature in a range from about 800° C. to about 1400° C., to form a phosphor composition having general formula $(Y_{1-x-y}A_yEu_x)_2O_3$ with $0<x<1$ and $0\leq y<1$, wherein A is at least one element selected from the group consisting of gadolinium, lutetium, lanthanum, scandium and terbium.

2. The method of claim 1, wherein the temperature is in a range from about 1000° C. to about 1375° C.

3. The method of claim 1, wherein the oxalate-flux mixture is heated in an atmosphere comprising oxygen.

4. The method of claim 1, wherein $y>0$ and the oxalate-flux mixture comprises gadolinium.

5. A method, comprising:
   forming an oxalate-flux mixture by mixing a co-precipitated yttrium-europium-gadolinium oxalate with a barium borate flux material, and heating the oxalate-flux mixture at a temperature in a range from about 1000° C. to about 1400° C. in an atmosphere comprising oxygen, to form a phosphor composition having general formula $(Y_{1-x-y}Gd_yEu_x)_2O_3$ wherein $0<x<1$ and $0<y<1$.

6. A method, comprising:
   heating a mixture comprising a co-precipitated yttrium-europium oxalate to a temperature in a range from about 800° C. to about 1400° C. with an inorganic flux material comprising $BaB_8O_{13}$;
   cooling the heated mixture to ambient temperature to provide a phosphor dispersed in the flux material; and
   separating the phosphor from the flux material.

7. The method of claim 6, wherein the mixture further comprises at least one compound selected from a group consisting of a compound of gadolinium, a compound of lanthanum, a compound of scandium, a compound of terbium, and a compound of lutetium.

8. The method of claim 6, wherein the mixture is heated in an atmosphere comprising oxygen.

9. The method of claim 6, wherein the temperature is in a range from about 1000° C. to about 1375° C.

10. The method of claim 6, wherein the mixture further comprises gadolinium.

* * * * *